May 5, 1936. J. G. ALTHER 2,039,379
CONVERSION OF HYDROCARBON OILS
Original Filed Oct. 3, 1932
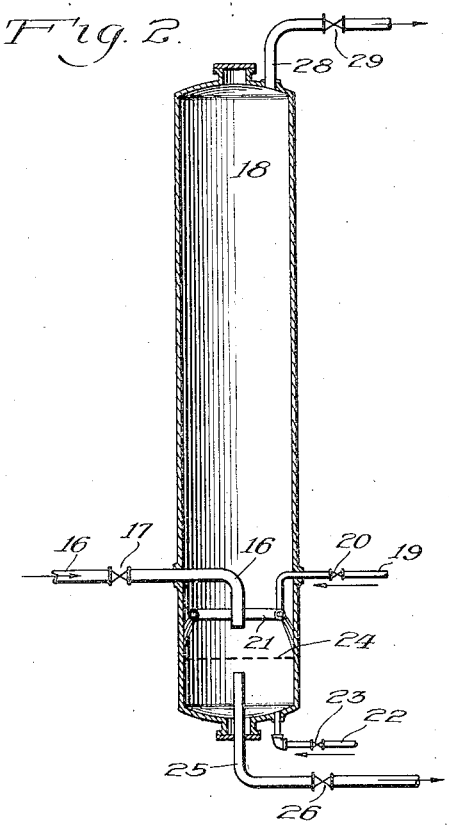
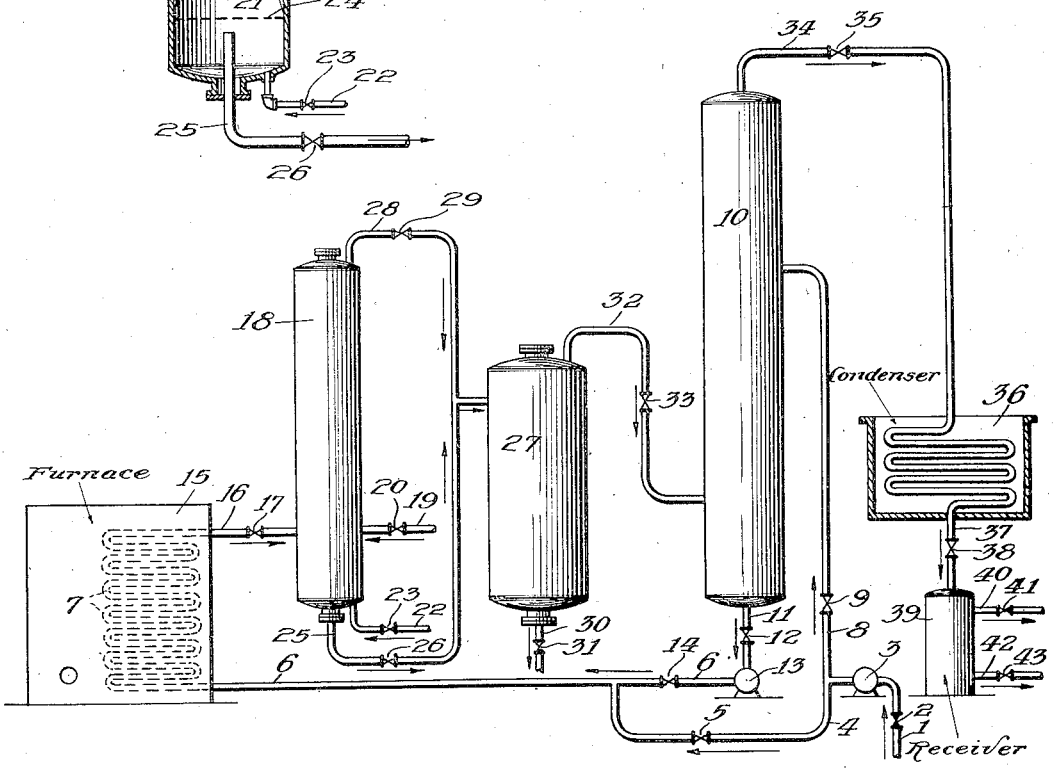
Inventor:
Joseph G. Alther,
By Frank L. Belknap
Attorney.

Patented May 5, 1936

2,039,379

UNITED STATES PATENT OFFICE 2,039,379

CONVERSION OF HYDROCARBON OILS

Joseph G. Alther, Chicago, Ill., assignor to Universal Oil Products Company, Chicago, Ill., a corporation of Delaware Application October 3, 1932, Serial No. 635,921
Renewed April 2, 1934

11 Claims. (Cl. 196—58)

This invention relates to improvements in the type of cracking system wherein heated conversion products are introduced into an enlarged reaction chamber, maintained at superatmospheric pressure, wherein vapors and residual liquid products are quickly separated, the vapors being subjected to continued conversion time in the reaction chamber while the residual liquid is quickly removed therefrom to further vaporization at reduced pressure, said improvements being directed to a method and means of preventing the formation and accumulation of coke in the reaction chamber resulting from the excessive conversion of the residual liquid.

I have found that the formation and accumulation of coke and heavy pitchy material within the reaction chamber of a cracking system such as above described, tending to restrict or block the flow of residual oil from the chamber, starts from two sources; first, there is a tendency for coke to form and accumulate at any point where the heavy heated oil splashes or is sprayed against the walls of the chamber, and second, when cooling oil is introduced to cool the liquid residue, instead of mixing thoroughly, when introduced in the ordinary manner, there is a tendency for the residual oil to stratify above the cooling oil, which latter collects in the bottom of the chamber, and the residual oil thus held away from the outlet which is also normally in the bottom of the chamber tends to form a bridge or dome of coke across the chamber and thus obstruct or block the residuum outlet.

In the present invention I have taken advantage of these facts to obtain the quick removal of residual liquid from the reaction chamber without allowing the formation or accumulation of coke within the chamber. This is accomplished by a series of steps which are most effective only in combination. Although the various steps will be defined in logical order from the introduction of the heated conversion products to the removal of the residual oil from the chamber, they will of course be accomplished concomitantly during continuous operation of the process. The heated conversion products from the heating coil of the system are introduced into the lower portion of the reaction chamber, preferably in a downward direction, wherein the residual liquid, which gravitates toward the bottom of the chamber, will separate from the lighter vaporous conversion products, which pass upward through the chamber to a vapor outlet within its upper portion, being subjected during their passage through the chamber to continued conversion time. Cooling oil, instead of being introduced at a single point into the body of residual liquid, is introduced into the chamber in part in the form of a spray directed against the chamber walls at or above the point of contact of the heated conversion products with the walls of the chamber. The remainder of the cooling oil is introduced into the bottom of the chamber. The remaining step is the removal of residual liquid from the lower portion of the chamber at a point intermediate the bottom of the chamber and the point of introduction of the heated conversion products. In this manner a protecting body of cooling oil is maintained in the bottom of the chamber and a film or sheet of cooling oil protects the side walls of the chamber at the point of contact of the residual liquid therewith and the residual liquid thus suspended above the bottom of the chamber is withdrawn together with that portion of the cooling oil which mixes with the residual liquid.

The attached diagrammatic drawing illustrates one specific form of apparatus incorporating the features of the present invention, although it should be understood that the application of the features of the invention is not limited to the specific form of apparatus illustrated.

Figure 1 of the drawing is a side elevation of the cracking system and Figure 2 is an enlarged sectional elevation of the reaction chamber shown in Figure 1.

Raw oil charging stock for the system is supplied through line 1 and valve 2 to pump 3, from which it may be fed through line 4, valve 5 and line 6 to heating coil 7 or, when desired, a portion or all of the charging stock instead of passing directly to heating coil 7 may be fed from pump 3 through line 8 and valve 9 into fractionator 10, coming into direct contact in this zone with the hot vaporous conversion products of the process undergoing fractionation. The raw oil thus introduced into the fractionator serves to assist fractionation of the vapors and is collected in the lower portion of the fractionator, together with their insufficiently converted components, which are condensed as reflux condensate, and withdrawn therefrom through line 11 and valve 12 to pump 13, from which the reflux condensate or reflux condensate and raw oil is fed through line 6 and valve 14 to heating coil 7.

A furnace 15 of any suitable form supplies the required heat to the oil passing through heating coil 7 to bring it to the desired conversion temperature, preferably at a substantial superatmospheric pressure, and the heated oil is discharged from the heating coil through line 16 and valve 17 into the lower portion of reaction chamber 18.

As illustrated in Figure 2, line 16 preferably extends to the central portion of the reaction chamber and points downward in order to direct the heated conversion products toward the bottom of the chamber. The vaporous and residual liquid conversion products separate in chamber 18, the vapors passing upward through the chamber and being subjected to continued conversion time during their passage therethrough, while the non-vaporous residual conversion products collect in the lower portion of the chamber.

A suitable cooling oil, such as for example a portion of the raw oil charging stock supplied to the system, a portion of the reflux condensate, any suitable intermediate product from within the system or suitable oil from an external source, or a mixture of any such materials, is supplied through line 19 and valve 20 and directed by suitable means such as a spray coil 21, against the inner surface of the walls of the reaction chamber at a point on the walls above that at which any considerable quantity of residual oil will be sprayed or splashed against the chamber walls, thus affording a protecting film of cooling oil over that portion of the chamber walls which would otherwise be subject to coke accumulations.

Another stream of cooling oil, which may be the same or different oil than that introduced through line 19, as described, is supplied through line 22 and valve 23 into the bottom of chamber 18. The cooling oil supplied through line 22 forms a protecting pool in the bottom of the chamber but, due to its continuous introduction and the maintenance of a level of residual liquid in the chamber such as indicated for example by line 24 in Figure 2, the cooling oils from both lines 19 and 22 gradually mix with the residual oil to cool it before it is withdrawn from the chamber and thus prevent the formation and deposition of coke in the residual draw-off line from the chamber.

In this manner the residual oil, and any cooling oil admixed therewith, suspended above the pool of cooling oil in the lower portion of the chamber is floated off through line 25, the inlet end of which terminates at a point above the bottom of the chamber and below the discharge end of line 16. The inlet end of line 25 is also preferably somewhat below the level of liquid maintained in the lower portion of the reaction chamber.

The residual oil thus withdrawn from chamber 18 is discharged through line 25 and valve 26 into vaporizing chamber 27, and vaporous conversion products withdrawn from the upper portion of chamber 18 through line 28 and valve 29 may commingle in line 25 with the residual oil passing therewith to chamber 27, or the vaporous products may be supplied directly to fractionator 10 or may be separately introduced into chamber 27 by well known means not illustrated in the drawing.

Chamber 27 is preferably operated at substantially reduced pressure relative to that employed in chamber 18, by means of which further vaporization of the residual oil supplied to this zone is effected. By regulation of the operating conditions of the process a residual product ranging in quality from residual liquid suitable as fuel oil, through the various stages of asphaltic and pitchy materials to substantially dry petroleum coke may be produced in chamber 27. When residual liquid is produced it may be withdrawn from chamber 27 through line 30 and valve 31 to cooling and storage or to any desired further treatment. When coke or other solid or semi-solid material is produced as the residual product of the process it may be allowed to accumulate in chamber 27 and, when desired, a plurality of coking chambers similar to chamber 27 but not illustrated may be employed to provide additional space for the deposition of coke and may be either alternately or simultaneously operated.

Vaporous products from chamber 27 pass through line 32 and valve 33 to fractionation in fractionator 10, wherein as already indicated, their insufficiently converted components are condensed as reflux condensate to be returned to heating coil 7 for further conversion. Fractionated vapors of the desired end boiling point pass, together with uncondensable gas produced by the process, from the upper portion of the fractionator through line 34 and valve 35, are subjected to condensation and cooling in condenser 36, from which the resulting distillate and uncondensable gas passes through line 37 and valve 38 to be collected in receiver 39. Uncondensable gas may be released from the receiver through line 40 and valve 41. The distillate collecting in receiver 39 may be withdrawn to storage or to any desired further treatment through line 42 and valve 43. A portion of the distillate from receiver 39 may, when desired, be recirculated, by well known means not shown in the drawing, to the upper portion of the fractionator 10 to assist fractionation of the vapors and to maintain the desired vapor outlet temperature.

Conversion temperatures employed at the outlet from the heating coil may range, for example, from 850 to 1050° F., or thereabouts, preferably with a superatmospheric pressure at this point ranging for example from 100 to 800 pounds or more per square inch. Any desired pressure within substantially this same range but not greater than that employed at the outlet from the heating coil may be utilized in the reaction chamber but the pressure is preferably reduced in the vaporizing or coking chamber, said reduced pressures ranging for example from 100 pounds, or thereabouts, per square inch, down to substantially atmospheric pressure. Pressures substantially equalized with or somewhat reduced relative to the pressure employed in the vaporizing or coking chamber may be utilized in the fractionating, condensing and collecting portions of the system.

As a specific example of the operation of the process of the present invention as it may be practised in an apparatus such as illustrated and above described, the charging stock is a 46° A. P. I. gravity Pennsylvania distillate which is subjected, together with the reflux condensate from the fractionator, to a conversion temperature at the outlet from the heating coil of about 950° F. at a superatmospheric pressure of approximately 400 pounds per square inch. Substantially this same pressure is maintained in the reaction chamber.

Reflux condensate amounting to about 18% of the charging stock is supplied as cooling oil to the reaction chamber in the manner illustrated in the drawing. A reduced pressure of about 50 pounds per square inch is maintained in the vaporizing chamber and is substantially equalized in the succeeding fractionating, condensing and collecting portions of the system. An operation such as outlined may yield, per barrel of charging stock, about 75% of motor fuel having an antiknock value equivalent to an octane number of approximately 78, the additional products of the system being about 12% of residual oil, containing less than 0.1% of B. S. and suspended carbonaceous material, and a total of about 13% based on the charging stock chargeable to uncondensable gas, loss and a negligible amount of coke.

I claim as my invention:

1. In a process for the conversion of hydrocarbon oil wherein heated conversion products are introduced into an enlarged reaction chamber maintained at super-atmospheric pressure and therein subjected to continued conversion time, the improvement which comprises the following concomitant steps: introducing the heated conversion products into the lower portion of the reaction chamber in a downward direction, spraying cooling oil against the lower portion of the walls of the chamber at a point above that at which appreciable coke formation would normally occur, introducing additional cooling oil into the bottom of the chamber to flow in an upward direction and withdrawing residual liquid conversion products, together with the cooling oil admixed therewith, from the chamber at a point intermediate the bottom of the chamber and the point of introduction of the heated conversion products whereby to prevent the appreciable formation and deposition of coke in the lower portion of the reaction chamber.

2. A process of the character defined in claim 1 wherein the cooling oil supplied to the reaction chamber comprises intermediate conversion products from within the system.

3. A process of the character defined in claim 1 wherein the cooling oil supplied to the reaction chamber comprises raw oil charging stock for the process.

4. A process of the character defined in claim 1 wherein the cooling oil supplied to the reaction chamber comprises combined feed for the system consisting of a mixture of raw oil charging stock and reflux condensate.

5. A process of the character defined in claim 1 wherein the cooling oil supplied to the reaction chamber comprises oil from an external source.

6. A reaction chamber for use in the conversion of hydrocarbon oils which comprises, in combination, a vertically disposed cylindrical shell with closed top and bottom, means for introducing heated conversion products into the lower portion of the reaction chamber in a downward direction, means for supplying cooling oil in the form of a spray against the lower portion of said cylindrical shell, means for supplying cooling oil into the bottom of the reaction chamber, means for withdrawing vaporous conversion products from the upper portion of the reaction chamber and means for removing the liquid conversion products and cooling oil from the lower portion of the reaction chamber at a point intermediate the bottom of the chamber and the point of introduction of the heated conversion products.

7. In the conversion of hydrocarbon oils wherein the oil is heated to cracking temperature under pressure while flowing in a restricted stream through a heating zone and the heated oil discharged into an enlarged reaction chamber maintained under cracking conditions of temperature and pressure; the improvement which comprises the following concomitant steps: introducing the heated oil to the chamber in a downward direction, filming cooling oil over the portion of the side walls of said chamber with which unvaporized conversion products normally contact, introducing additional cooling oil into the bottom of the chamber to flow in an upward direction, maintaining a pool of cooling oil in the bottom of the chamber, and withdrawing admixed cooling oil and unvaporized conversion products from the chamber at a point intermediate the bottom thereof and the point of introduction of the heated oil thereto.

8. In the conversion of hydrocarbon oils wherein the oil is heated to cracking temperature under pressure while flowing in a restricted stream through a heating zone and the heated oil discharged into an enlarged reaction chamber maintained under cracking conditions of temperature and pressure; the improvement which comprises the following concomitant steps: introducing the heated oil to the chamber in a downward direction, spraying cooling oil over the portion of the side walls of said chamber with which unvaporized conversion products normally contact, introducing additional cooling oil to the chamber adjacent the bottom thereof to flow in an upward direction, and withdrawing admixed cooling oil and unvaporized conversion products from the chamber at a point intermediate the points of introduction of said heated oil and additional cooling oil.

9. In the conversion of hydrocarbon oils wherein the oil is heated to cracking temperature under pressure while flowing in a restricted stream through a heating zone and such heated oil subsequently discharged into an enlarged separating chamber wherein vapors are separated from unvaporized conversion products; the improvement which comprises the following concomitant steps: introducing the heated oil to the chamber in a downward direction, filming cooling oil over the portion of the side walls of said chamber with which unvaporized conversion products normally contact, introducing additional cooling oil into the bottom of the chamber to flow in an upward direction, maintaining a pool of cooling oil in the bottom of the chamber, and withdrawing admixed cooling oil and unvaporized conversion products from the chamber at a point intermediate the bottom thereof and the point of introduction of the heated oil thereto.

10. In the conversion of hydrocarbon oils wherein the oil is heated to cracking temperature under pressure while flowing in a restricted stream through a heating zone and such heated oil subsequently discharged into an enlarged separating chamber wherein vapors are separated from unvaporized conversion products; the improvement which comprises the following concomitant steps: introducing the heated oil to the chamber in a downward direction, spraying cooling oil over the portion of the side walls of said chamber with which unvaporized conversion products normally contact, introducing additional cooling oil to the chamber adjacent the bottom thereof to flow in an upward direction, and withdrawing admixed cooling oil and unvaporized conversion products from the chamber at a point intermediate the points of introduction of said heated oil and additional cooling oil.

11. In combination with the enlarged vertically disposed reaction or separating chamber of a cracking system, means for introducing heated oil in a downward direction to the chamber above the bottom thereof, means for filming cooling oil over the lower portion of the inner side walls of the chamber, means for introducing additional cooling oil to the chamber adjacent the bottom thereof, a liquid outlet above the last-named means and below the point of introduction of said heated oil for removing unvaporized oil from the chamber, and means for removing vapors from the upper portion of the chamber.

JOSEPH G. ALTHER.